US007227709B1

(12) United States Patent
Pipal et al.

(10) Patent No.: US 7,227,709 B1
(45) Date of Patent: Jun. 5, 2007

(54) SYSTEM AND METHOD FOR PROVIDING HEAD AMPLITUDE CHARACTERIZATION

(75) Inventors: Vicki Lynn Pipal, Rochester, MN (US); Michael William Curtis, Rochester, MN (US); Raymond Alan Richetta, Rochester, MN (US); Koji Nasu, Takaraduka (JP)

(73) Assignees: Hitachi Global Storage Technologies Netherlands B.V. (NL); Renesas Technology Corporation, Tokyo (JP)

( * ) Notice: Subject to any disclaimer, the term of this patent is extended or adjusted under 35 U.S.C. 154(b) by 0 days.

(21) Appl. No.: 11/338,518

(22) Filed: Jan. 23, 2006

(51) Int. Cl.
*G11B 5/09* (2006.01)

(52) U.S. Cl. .............................. 360/46; 360/25; 360/31; 360/32; 360/67; 341/118; 341/139

(58) Field of Classification Search ................ 341/139; 360/46
See application file for complete search history.

(56) References Cited

U.S. PATENT DOCUMENTS

| | | | |
|---|---|---|---|
| 4,635,142 A | 1/1987 | Haugland | 360/46 |
| 4,750,058 A | 6/1988 | Hirt et al. | 360/46 |
| 5,375,145 A | 12/1994 | Abbott et al. | 375/345 |
| 5,442,492 A * | 8/1995 | Cunningham et al. | 360/46 |
| 5,576,906 A | 11/1996 | Fisher et al. | 360/77.08 |
| 5,737,342 A | 4/1998 | Ziperovich | 714/736 |
| 6,078,444 A * | 6/2000 | Vishakhadatta et al. | 360/32 |
| 6,429,988 B1 * | 8/2002 | Bhaumik et al. | 360/46 |
| 6,441,983 B1 | 8/2002 | Philpott et al. | 360/67 |
| 6,519,103 B2 | 2/2003 | Cyrusian | 360/46 |
| 6,628,467 B2 * | 9/2003 | Cyrusian | 360/46 |
| 6,661,590 B2 * | 12/2003 | Cyrusian et al. | 360/32 |
| 6,671,112 B2 * | 12/2003 | Murakami et al. | 360/39 |
| 7,027,245 B2 * | 4/2006 | Mitchell et al. | 360/46 |
| 7,057,835 B2 * | 6/2006 | Chan et al. | 360/46 |
| 2005/0213238 A1 | 9/2005 | Mitchell | 360/46 |
| 2005/0243456 A1 | 11/2005 | Mitchell | 360/46 |

OTHER PUBLICATIONS

Mary McCarthy, "Peak-to-Peak Resolution Versus Effective Resolution," Analog Devices, Application Note, AN-615, Jul. 11, 2003, pp. 1-2. www.analong.com.
"DC Characterization of an ADC," Pre-Lab, ENTC 351 Lab 7, 1999, http://ee.tamu.edu/inseok/entc351/prelab7_1999.pdf, no month.

* cited by examiner

*Primary Examiner*—Khai M. Nguyen
(74) *Attorney, Agent, or Firm*—John L. Rogitz

(57) ABSTRACT

To calibrate the VGA of a read head, test signals from a DAC are input to the VGA and the output of the VGA is observed, with the gain of the VGA being adjusted as appropriate. So that the DAC need not be made with tight tolerances, a DC signal can be fed into the DAC prior to VGA calibration, and an auxiliary ADC is used to receive the output of the DAC and to determine, for a given DC input, what the signal produced by the DAC actually is. In this way, during subsequent VGA calibration the test signal from the DAC is known not by virtue of the DAC having a tight manufacturing tolerance but by virtue of the actual measurements of its outputs for given register inputs.

10 Claims, 4 Drawing Sheets

CHAR ENGINE

SYSTEM AND METHOD FOR PROVIDING HEAD AMPLITUDE CHARACTERIZATION

I. FIELD OF THE INVENTION

The present invention generally relates to providing head amplitude characterization in a disk drive.

II. BACKGROUND OF THE INVENTION

A read channel circuit in a magnetic disk drive device includes components for processing the analog read signal generated by the read/write head of the device. This processing provides automatic gain control (AGC) amplification, filtering, and equalization, as well as analog-to-digital conversion.

A hard drive can read data by detecting a voltage peak that is sensed when a magnetic flux reversal on a magnetic disk passes underneath the read/write head. More recently, a partial response maximum likelihood (PRML) algorithm has been introduced to interpret the magnetic signals sensed by the read/write heads. PRML disk drives read the analog waveforms generated by the magnetic flux reversals stored on the disk. Rather than look for peak values to indicate flux reversals, PRML digitally samples the analog waveform (the "partial response" portion of the algorithm) and applies signal processing to determine the bit pattern represented by the waveform (the "maximum likelihood" portion of the algorithm).

In any case, a normalized readback signal amplitude is often required for proper data detection. To this end, a variable gain amplifier (VGA) may be used in the analog signal path for scaling the readback signal. Because of material and manufacturing variations, each head has a different characteristic signal output level than other heads.

First, the VGA is calibrated using a square wave generator such as a digital to analog converter (DAC). Once the VGA is calibrated, a test signal from the read head is sent. The resulting VGA gain code is recorded. From this process, the input signal from the read head can be characterized for future use in actual data read operations.

It can readily be recognized that it is important to know the input signal to the VGA during calibration, and one way to do this is to input known test signals. However, this requires a very accurate test signal source. As recognized herein, it is desirable to undertake the above read head signal characterization process without requiring tight tolerances of the test signal source.

SUMMARY OF THE INVENTION

An adjustable square wave generator such as a digital-to-analog converter (DAC) can be provided for characterizing the input signal amplitude of a read head. The amplitude of the square wave that is actually generated iS first characterized as follows. For a given register code, a DC measurement is made of the positive reference voltage and the negative reference voltage from the DAC using an auxiliary analog-to-digital converter (AUX ADC). The difference between the two measurements provides an accurate measurement of the actual peak to peak amplitude of the square wave that is generated by the DAC, so that subsequent VGA calibration can be done using the DAC without requiring the DAC to have tight manufacturing tolerances.

Accordingly, in a first aspect a magnetic disk drive has a read head, a variable gain amplifier (VGA) configured to receive signals from the read head, and a test signal generator such as but not limited to a DAC configured to send test signals to the VGA. An analog to digital converter (ADC) receives signals directly from the test signal generator without the signals first being passed through the VGA.

In some implementations a logic component receives signals from the ADC and uses the signals from the ADC to establish a characterized signal generator output. The logic component then uses the characterized signal generator output in subsequent calibration of the VGA and/or read head input signal characterization. The ADC can be an auxiliary ADC and if desired, the drive can also include a continuous time filter (CTF) receiving signals from the VGA and a main ADC receiving signals from the CTF. The logic component uses output from the main ADC to calibrate the VGA using the DAC, and uses output from the AUX ADC to characterize the DAC. The logic component and the signal generator are both electrically connected to the AUX ADC in this non-limiting implementation.

In another aspect, a read channel chip includes a signal generator configured to generate test signals under control of a logic component, and a read channel including a VGA receiving at least some test signals and outputting a VGA signal in response. The read channel also includes a main ADC for digitizing the VGA signal. A characterization device is provided for receiving signals from the signal generator and outputting signals to the logic component to measure at least one amplitude in at least one test signal from the signal generator.

In still another aspect, a printed circuit board for a hard disk drive includes a test signal generator generating a reference signal and a read channel VGA receiving the reference signal and providing test output. A logic component establishes a gain of the VGA based at least in part on the test output. Means communicate with the logic component for characterizing the reference signal through measurement before the reference signal is used to calibrate the VGA.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

In overview, the invention can be used to calibrate a VGA and/or to characterize the input signal amplitude of a read head. In accordance with principles known in the art, the VGA is calibrated by using a square wave generator by allowing the system to set up to a known small signal and saving the VGA code. The system is then allowed to set up to a known large signal and saving the resulting gain code. By "set up" means that the automatic gain control loops are allowed to set the gain according to ADC samples of the input signal in accordance with principles known in the art. This process yields the VGA's gain curve. The invention can then be used to characterize the square wave generator in accordance with principles set forth further below. With the system being thus calibrated, it is ready for a test signal from the head. The system is allowed to set up, then the VGA gain code is recorded, with the input signal level from the head being obtained therefrom in accordance with principles known in the art to characterize the input signal amplitude of the read head.

Figure 1:
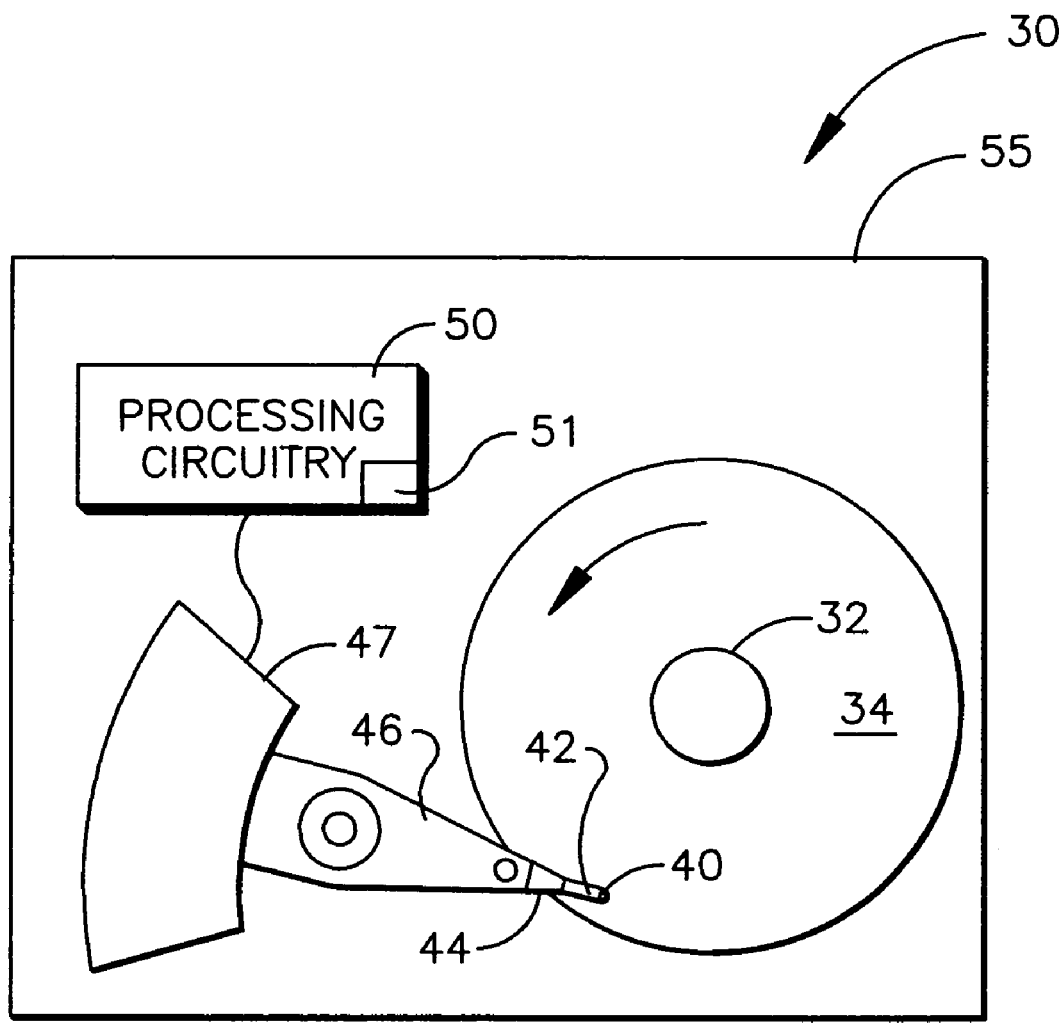
FIG. 1 is a schematic plan view of a hard disk drive, showing one non-limiting environment for the present invention.

Referring initially to FIG. 1, a magnetic disk drive 30 includes a spindle 32 that supports and rotates a magnetic disk 34. The spindle 32 is rotated by a spindle motor that is controlled by a motor controller which may be implemented in the electronics of the drive. A slider 42 has a combined read and write magnetic head 40 and is supported by a suspension 44 and actuator arm 46 that is rotatably positioned by an actuator 47. The head 40 may be a GMR or MR head or other magnetoresistive head. It is to be understood that a plurality of disks, sliders and suspensions may be employed. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin cushion of air known as the air bearing that exists between the surface of the disk 34 and an air bearing surface (ABS) of the head. The magnetic head 40 may then be employed for writing information to multiple circular tracks on the surface of the disk 34, as well as for reading information therefrom. To this end, processing circuitry 50, which can include a read channel chip 51, exchanges signals, representing such information, with the head 40, provides spindle motor drive signals for rotating the magnetic disk 34, and provides control signals to the actuator for moving the slider to various tracks. The components described above may be mounted on a housing 55. Preferably, the disk(s) 34 are sealed in the housing 55.

The processing circuitry 50 may be implemented by a printed circuit board. The electrical components discussed below may be part of the processing circuitry 50. The below-described DAC and AUX ADC may be implemented on the read channel chip 51 or may be implemented separately from the read channel chip 51 on the circuit board of the processing circuitry 50.

Figure 2:
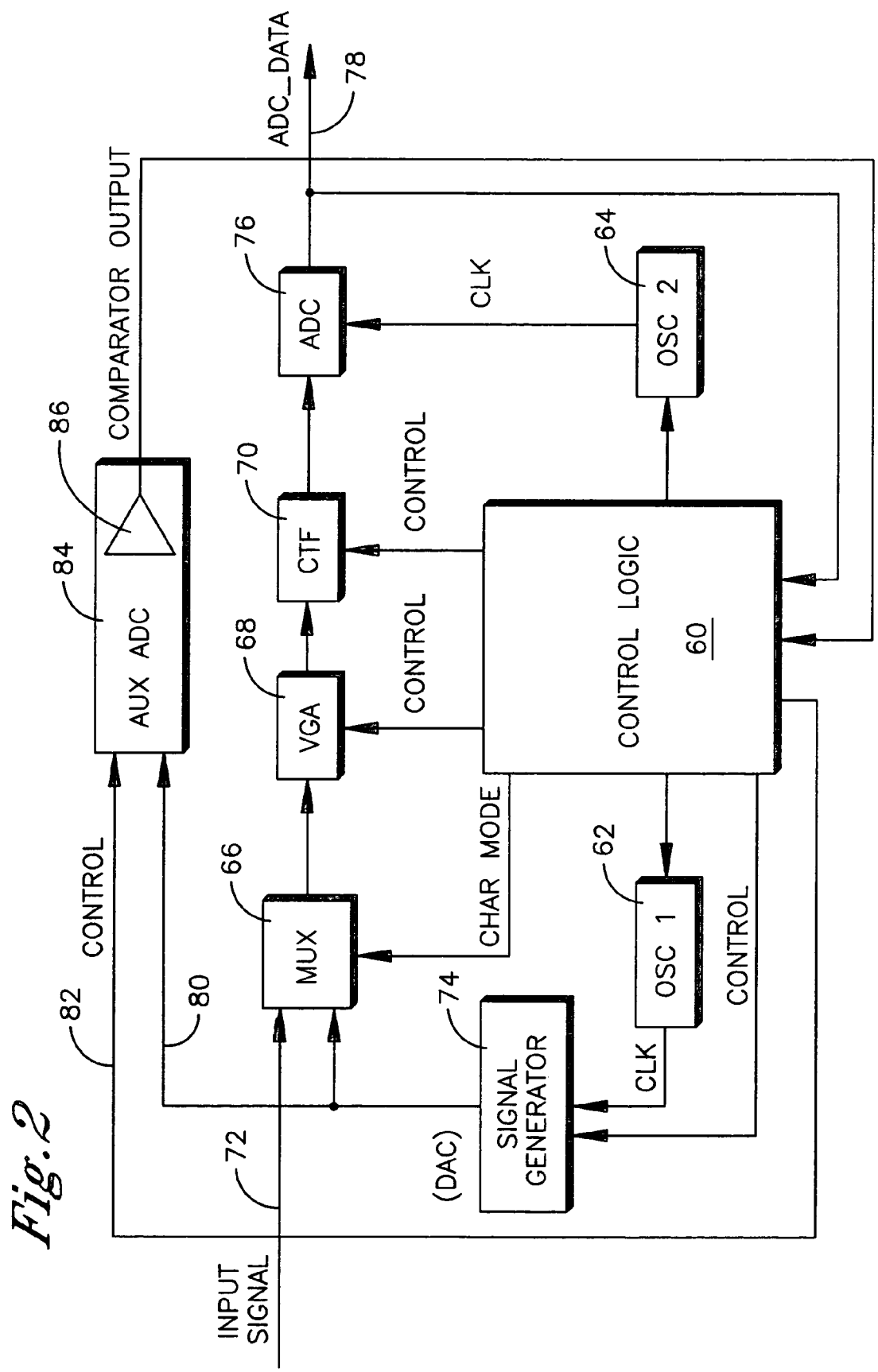
FIG. 2 is a non-limiting block diagram of the relevant portion of the processing circuitry.

Now referring to FIG. 2, relevant portions of the processing circuitry 50 may be seen. A control logic component 60 sends control signals to a signal generator oscillator 62 and to a main ADC oscillator 64. The logic component 60 also sends control signals to a multiplexer 66, a variable gain amplifier (VGA) 68, and a continuous time filter (CTF) 70 as shown. The multiplexer 66 receives an input signal 72 from the read head shown in FIG. 1 and a test signal from a signal generator 74, such as but not limited to a digital to analog converter (DAC). The logic component 60 controls the multiplexer 66 to pass either the read head signal 72 or the test signal from the signal generator 74 to the VGA 68, which outputs a signal to the CTF 70. In turn, the CTF 70 outputs a filtered signal to a main ADC 76, which during normal read head operation sends its signal on to further processing circuitry along a line 78 in accordance with read principles known in the art. During calibration of the VGA 68, on the other hand, the main ADC 76 sends its output to the logic component 60 as shown. The main ADC oscillator sends a clocking signal to the main ADC 76 in accordance with principles known in the art.

In accordance with the present invention, both the signal generator 74 and the logic component 60 send input signals along respective lines 80, 82 to an auxiliary ADC (AUX ADC) 84, which includes an AUX ADC comparator 86 that may be otherwise provided for other purposes, e.g., temperature measurement. The output of the AUX ADC comparator 86 is sent back to the logic component 60 for purposes to be shortly disclosed. The AUX ADC 84 is a non-limiting example of a characterization device for characterizing the signal generator.

Figure 3:
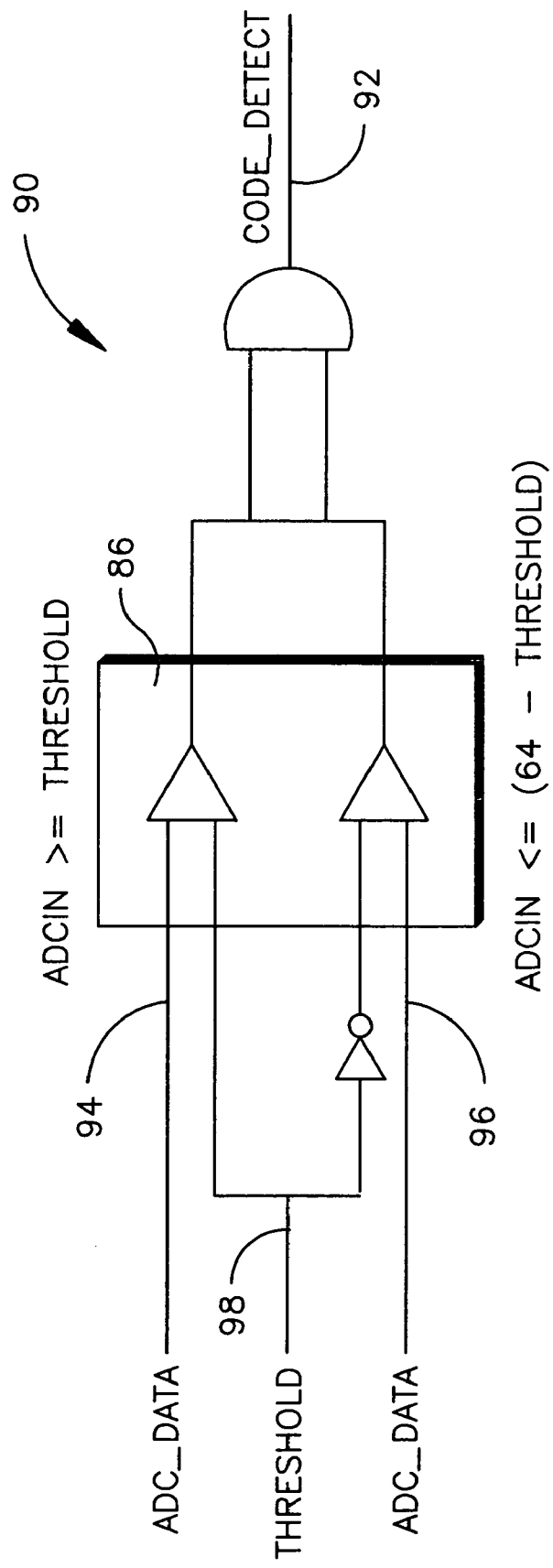
FIG. 3 shows a non-limiting logic implementation.
Figure 4:
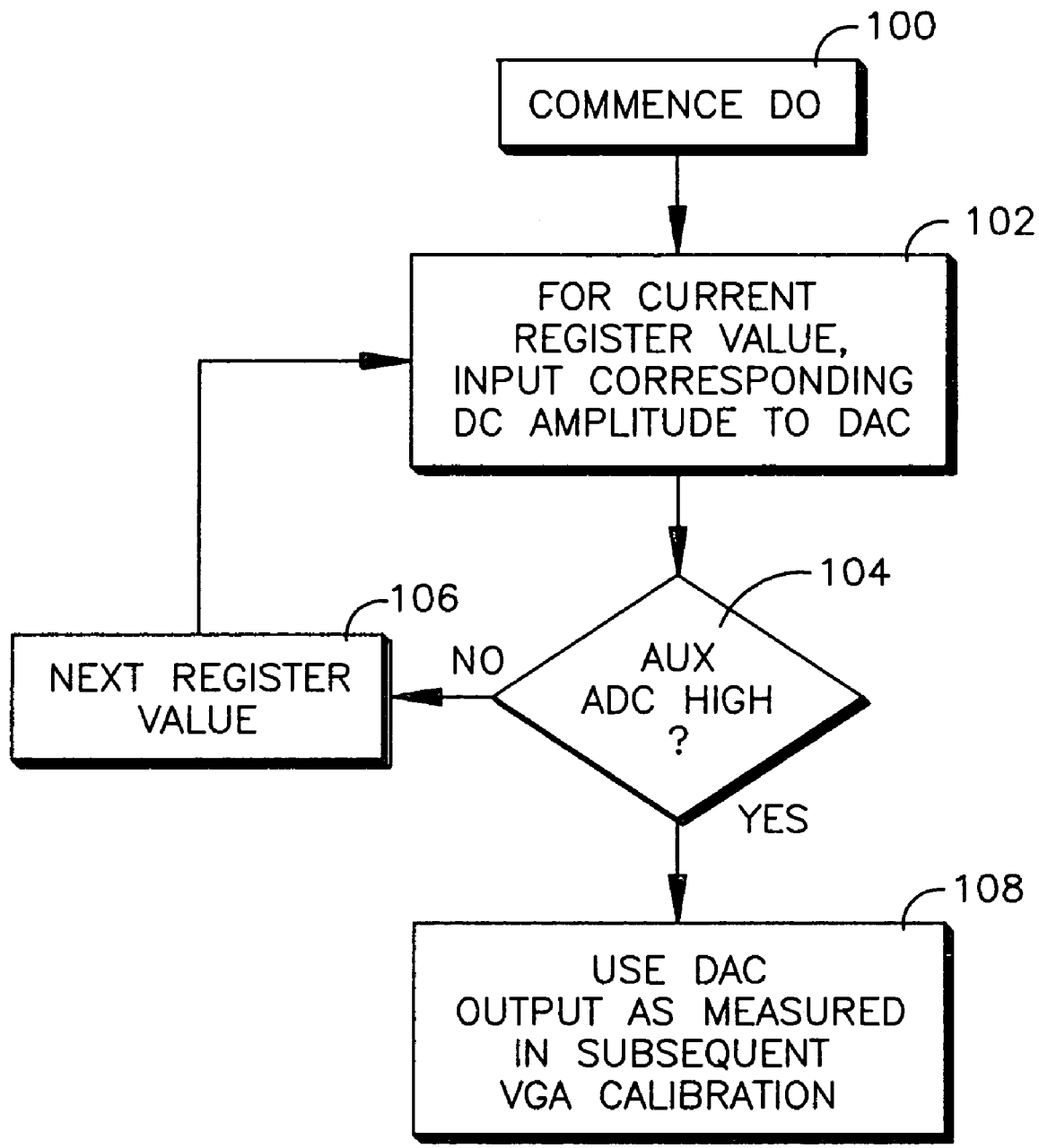
FIG. 4 is a flow chart of one implementation of the present logic.

FIG. 3 illustrates a non-limiting characterization engine that may be implemented by the logic component 60 in combination with the AUX ADC 84 for executing the logic of FIG. 4. The logic component 60 essentially detects a threshold voltage code from the AUX ADC according to an embodiment of the present invention. The signal generator 74 can be characterized using the AUX ADC as follows. During characterization, two different input amplitudes, as determined by the signal generator 74 low and high amplitudes, are generated by the signal generator 74 and input to the AUX ADC 84, which, when the ADC difference trip code is triggered, outputs a tripped signal (binary one) to the control logic component 60. In FIG. 3, a circuit 90 is shown for generating code detect signals 92. FIG. 3 shows that AUX ADC data 94, 96 is compared to a threshold 98 by the AUX ADC comparator 86, with a code detect signal 92 being generated in response to the comparison.

With a greater specificity and now referring to FIG. 4, at block 100 a DO loop is entered in which the logic, at block 102, uses a current register value to input a corresponding DC amplitude to the signal generator 74. This may be done by disabling the signal generator oscillator 62, which essentially places the signal generator in a DC mode. The resulting reference voltage generated by the signal generator 74 is then sent to the AUX ADC, where its amplitude is sensed. The logic component 60 then sends a signal to the signal generator 74 to flip the polarity of the reference voltage it outputs, and the resulting DC signal from the signal generator 74, representing the opposite polarity, is also sensed by the AUX ADC. The difference between the positive and negative voltage reference corresponds to the peak-to-peak amplitude of the square wave signal generated by the signal generator 74 for the particular register value.

Proceeding to decision diamond 104, it is determined whether the peak-to-peak reference voltage from the signal generator 74 is sufficient to cause the output of the AUX ADC to go high, indicating that the value of the reference voltage matches the trip value of the ADC. If the AUX ADC does not go high, the next higher register value (and corresponding input DC voltage to the signal generator 74) is selected at block 106, and the logic returns to block 102.

On the other hand, when the AUX ADC is triggered, this indicates that the reference voltage from the signal generator 74 matches the trip voltage of the AUX ADC and, hence, is known, since the trip voltage of the AUX ADC is known. The known (i.e., actually measured) reference voltage from the signal generator 74 is then correlated to the input voltage for the given register value that resulted in the AUX ADC tripping, so that at block 108, during subsequent VGA calibration using the signal generator 74, the logic component 60 need only look up the register value corresponding to the "trip" reference voltage and input the corresponding voltage to the signal generator 74. Hence, the reference voltage input to the VGA 68 is known not by the virtue of the signal generator having a tight manufacturing tolerance but by virtue of the actual measurements of its outputs for given input signals. VGA calibration may be undertaken in accordance with, e.g., the present assignee's U.S. patent publication no. 2005/0213238, or in U.S. Pat. No. 6,519,103, both of which are incorporated herein by reference.

The logic of FIG. 4 assumes a binary up search. It is to be understood, however, that the actual reference voltage of the signal generator 74 that trips the AUX ADC 84 may alternatively be established using other search methods, e.g., a successive approximation search, in which the first input to the signal generator 74 is the voltage corresponding to the zero register, the next is the voltage corresponding to register 128, and the third, if the AUX ADC goes high on the second, is the voltage corresponding to register 64. In contrast, if AUX ADC remains low after the second voltage, the voltage corresponding to register 192 is input to the signal generator 74, and so on in accordance with successive approximation search principles known in the art.

While the particular SYSTEM AND METHOD FOR PROVIDING HEAD AMPLITUDE CHARACTERIZATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". For instance, the invention can apply to longitudinal or horizontal magnetic recording as well as to vertical or perpendicular recording. It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A magnetic disk drive, comprising:
   at least one read head;
   at least one variable gain amplifier (VGA) configured to receive signals from the read head;
   at least one test signal generator configured to send test signals to the VGA;
   at least one analog to digital converter (ADC) directly receiving signals from the test signal generator without the signals first being passed through the VGA; and
   a logic component receiving signals from the ADC and using the signals from the ADC to establish a characterized signal generator output, the logic component using the characterized signal generator output in subsequent calibration of the VGA.

2. The disk drive of claim 1, wherein the signal generator is a DAC and the ADC is an auxiliary ADC (AUX ADC).

3. The disk drive of claim 2, further comprising a continuous time filter (CTF) receiving signals from the VGA and a main ADC receiving signals from the CTF, the logic component using output from the main ADC to calibrate the VGA using the DAC, the logic component using output from the AUX ADC to characterize the DAC.

4. The disk drive of claim 1, wherein the ADC is an auxiliary ADC (AUX ADC), the disk drive further comprises a main ADC receiving a filtered output of the VGA, and the logic component and the signal generator are both electrically connected to the AUX ADC.

5. A read channel chip, comprising:
   a digital to analog converter (DAC) configured to generate test signals under control of a logic component;
   a read channel including a VGA receiving at least some test signals and outputting a VGA signal in response, the read channel also including a main ADC for digitizing the VGA signal;
   an auxiliary ADC receiving signals from the DAC and outputting signals to the logic component to measure at least one amplitude in at least one test signal from the DAC; and
   a continuous time filter (CTF) receiving signals from the VGA and sending signals to the main ADC, the logic component using output from the main ADC to calibrate the VGA using the DAC, the logic component using output from the AUX ADC to characterize the DAC.

6. The chip of claim 5, wherein the VGA signal is filtered prior to being digitized by the main ADC.

7. A printed circuit board (PCB) for a hard disk drive, comprising:
   a test signal generator generating a reference signal;
   a read channel VGA receiving the reference signal and providing test output;
   a logic component establishing a gain of the VGA based at least in part on the test output; and
   means communicating with the logic components for characterizing the reference signal through measurement before the reference signal is used to establish the gain of the VGA.

8. The PCB of claim 7, wherein the test signal generator is a DAC.

9. The PCB of claim 7, wherein the means for characterizing includes an auxiliary ADC.

10. The PCB of claim 9, wherein the logic component uses at least one of a binary up search method or a successive approximation search method to cause a series of voltages to be input to the signal generator, the AUX ADC tripping when it receives a signal from the signal generator that exceeds a trip voltage of the AUX ADC.

* * * * *